United States Patent
Bhatia et al.

(10) Patent No.: US 9,928,206 B2
(45) Date of Patent: Mar. 27, 2018

(54) DEDICATED LAN INTERFACE PER IPMI INSTANCE ON A MULTIPLE BASEBOARD MANAGEMENT CONTROLLER (BMC) SYSTEM WITH SINGLE PHYSICAL NETWORK INTERFACE

(71) Applicant: American Megatrends, Inc., Norcross, GA (US)

(72) Inventors: Anurag Bhatia, Lilburn, GA (US); Samvinesh Christopher, Suwanee, GA (US)

(73) Assignee: AMERICAN MEGATRENDS INC., Norcross, GA (US)

( * ) Notice: Subject to any disclaimer, the term of this patent is extended or adjusted under 35 U.S.C. 154(b) by 261 days.

(21) Appl. No.: 14/805,251

(22) Filed: Jul. 21, 2015

(65) Prior Publication Data
US 2017/0024353 A1  Jan. 26, 2017

(51) Int. Cl.
*G06F 13/42* (2006.01)
*G06F 9/445* (2018.01)

(52) U.S. Cl.
CPC ...... *G06F 13/4282* (2013.01); *G06F 9/44505* (2013.01)

(58) Field of Classification Search
CPC . G06F 13/42; G06F 9/445; G06F 9/50; G06F 15/16
See application file for complete search history.

(56) References Cited

U.S. PATENT DOCUMENTS

| | | | | |
|---|---|---|---|---|
| 7,835,380 B1 * | 11/2010 | Aloni | ............... | H04L 12/40032 370/394 |
| 8,176,168 B1 * | 5/2012 | Ramamurthy | ...... | G06F 11/0712 709/224 |
| 8,478,907 B1 * | 7/2013 | Aloni | .................... | G06F 13/128 709/225 |
| 9,459,928 B2 * | 10/2016 | Bonola | ................ | G06F 9/5077 |
| 9,553,776 B2 * | 1/2017 | Geffin | ................... | G06F 13/385 |
| 9,733,980 B1 * | 8/2017 | Khan | ................... | G06F 9/4856 |
| 2008/0005748 A1 * | 1/2008 | Mathew | ............. | G06F 11/0712 719/318 |
| 2012/0155256 A1 * | 6/2012 | Pope | .................... | G06F 13/128 370/230 |
| 2013/0262700 A1 * | 10/2013 | Tamura | .................. | H04L 61/25 709/245 |

(Continued)

*Primary Examiner* — Steven Snyder
*Assistant Examiner* — Christopher A Daley
(74) *Attorney, Agent, or Firm* — Locke Lord LLP; Tim Tingkang Xia, Esq.

(57) ABSTRACT

A system includes a management controller for managing a plurality of computing platforms. The management controller includes a processor, a physical network interface controller (NIC), a volatile memory, and a non-volatile memory storing computer executable code. The computer executable code, when executed at the processor, is configured to: provide a plurality of firmware instances, each corresponding to a respective one of the computing platforms; configure a plurality of virtual NICs (VNICs), each of the VNICs corresponding to a respective one of the firmware instances, wherein the VNICs share network resource provided by the physical NIC; and for each of the firmware instances, in response to a communication command to transmit data through the corresponding VNIC, transmit the data through the physical NIC.

20 Claims, 5 Drawing Sheets

(56) References Cited

U.S. PATENT DOCUMENTS

| | | | | |
|---|---|---|---|---|
| 2014/0025821 A1* | 1/2014 | Baphna | ............... | H04L 61/2061 709/226 |
| 2014/0173072 A1* | 6/2014 | Chandrasekhar | ......... | G06F 9/00 709/223 |
| 2014/0281055 A1* | 9/2014 | Davda | ................ | G06F 12/1081 710/26 |
| 2014/0281314 A1* | 9/2014 | Fuse | ................ | G06F 15/17331 711/162 |
| 2014/0289570 A1* | 9/2014 | Lewis | ................ | G06F 11/3089 714/43 |
| 2015/0074251 A1* | 3/2015 | Tameshige | ............ | G06F 11/202 709/221 |
| 2016/0134559 A1* | 5/2016 | Abel | ...................... | H04L 47/80 370/389 |
| 2016/0371107 A1* | 12/2016 | Puthillathe | .......... | G06F 9/45558 |

* cited by examiner

DEDICATED LAN INTERFACE PER IPMI INSTANCE ON A MULTIPLE BASEBOARD MANAGEMENT CONTROLLER (BMC) SYSTEM WITH SINGLE PHYSICAL NETWORK INTERFACE

FIELD

The present disclosure relates generally to baseboard management controller (BMC) technology, and more particularly to a dedicated local area network (LAN) interface per IPMI instance on a multiple BMC (MBMC) system with single physical network interface.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A baseboard management controller (BMC) refers to a specialized microcontroller that manages the interface between system management software and platform hardware. The BMC may run multiple IPMI instances, and a separate physical network interface is used for each BMC instance to support LAN interface for that instance. This limits the number of instances that could be supported on a MBMC system as the physical network interfaces are limited on the BMC.

Therefore, an unaddressed need exists in the art to address the aforementioned deficiencies and inadequacies.

SUMMARY

In one aspect, the disclosure is directed to a system including a management controller for managing multiple computing platforms. In certain embodiments, the management controller includes a processor, a physical network interface (NIC), a volatile memory, and a non-volatile memory storing computer executable code. The computer executable code, when executed at the processor, is configured to:

provide a plurality of firmware instances, each corresponding to a respective one of the computing platforms;

configure a plurality of virtual NICs (VNICs), each of the VNICs corresponding to a respective one of the firmware instances, wherein the VNICs share network resource provided by the physical NIC; and for each of the firmware instances, in response to a communication command to transmit data through the corresponding VNIC, transmit the data through the physical NIC.

In certain embodiments, each of the firmware instances is communicatively connected to the corresponding one of the computing platforms through the VNICs.

In certain embodiments, the computer executable code, when executed at the processor, is further configured to:

provide a plurality of communication interfaces, each configured to communicatively connect the firmware instances to the corresponding one of the computing platforms.

In certain embodiments, the communication interfaces includes a system interface, and the system interface includes an intelligent platform management bus (IPMB) interface, a keyboard controller style (KCS) interface, a server management interface chip (SMIC) interface, a block transfer (BT) interface, and a SMBus system interface (SSIF).

In certain embodiments, the physical NIC is assigned with a media access control (MAC) address, and each of the VNICs is assigned with a specific MAC address different from the MAC address of the physical NIC, such that outgoing and incoming information through the physical NIC are diverted to the respective VNICs based on the specific MAC addresses of the VNICs.

In certain embodiments, the computer executable code includes a firmware instance module configured to provide the firmware instances, and a VNIC module for configuring the VNICs.

In certain embodiments, the management controller is a multiple baseboard management controller (MBMC).

In certain embodiments, the system further includes at least one remote computing device in communication with at least one of the firmware instances through the physical NIC and the VNIC corresponding to the at least one of the firmware instances.

In another aspect, the disclosure is directed to a method for managing multiple computing platforms. In certain embodiments, the method includes:

providing, by a management controller, a plurality of firmware instances, wherein each of the firmware instances corresponds to a respective one of the computing platforms;

configuring, by the management controller, a plurality of virtual network interface controllers (VNICs), wherein the VNICs share network resource provided by a physical network interface controller (NIC) of the management controller; and for each of the firmware instances, in response to a communication command to transmit data through the corresponding VNIC, transmitting the data through the physical NIC.

In certain embodiments, each of the firmware instances is communicatively connected to the corresponding one of the computing platforms through the VNICs.

In certain embodiments, the method further includes:

providing a plurality of communication interfaces, each configured to communicatively connect the firmware instances to the corresponding one of the computing platforms.

In certain embodiments, the communication interfaces includes a system interface, and the system interface includes an intelligent platform management bus (IPMB) interface, a keyboard controller style (KCS) interface, a server management interface chip (SMIC) interface, a block transfer (BT) interface, and a SMBus system interface (SSIF).

In certain embodiments, the physical NIC is assigned with a media access control (MAC) address, and each of the VNICs is assigned with a specific MAC address different from the MAC address of the physical NIC, such that outgoing and incoming information through the physical NIC are diverted to the respective VNICs based on the specific MAC addresses of the VNICs.

In certain embodiments, the management controller is a multiple baseboard management controller (MBMC).

In a further aspect, the disclosure is directed to a non-transitory computer readable medium storing computer executable code executable at a processor of a management controller. In certain embodiments, the computer executable code, when executed at the processor of the management controller, is configured to:

provide a plurality of firmware instances, each corresponding to a respective one of the computing platforms; and configure a plurality of virtual network interface controllers (VNICs), where each of the VNICs corresponding to a respective one of the firmware instances, and the VNICs share network resources provided by a physical network interface controller (NIC); and for each of the firmware instances, in response to a communication command to transmit data through the corresponding VNIC, transmit the data through the physical NIC.

In certain embodiments, each of the firmware instances is communicatively connected to the corresponding one of the computing platforms through the VNICs.

In certain embodiments, the computer executable code, when executed at the processor of the management controller, is further configured to: provide a plurality of communication interfaces, each configured to communicatively connect the firmware instances to the corresponding one of the computing platforms.

In certain embodiments, the communication interfaces includes a system interface, and the system interface includes an intelligent platform management bus (IPMB) interface, a keyboard controller style (KCS) interface, a server management interface chip (SMIC) interface, a block transfer (BT) interface, and a SMBus system interface (SSIF).

In certain embodiments, the physical VNIC is assigned with a media access control (MAC) address, and each of the VNICs is assigned with a specific MAC address different from the MAC address of the physical NIC, such that outgoing and incoming information through the physical NIC are diverted to the respective VNICs based on the specific MAC addresses of the VNICs.

In certain embodiments, the management controller is a multiple baseboard management controller (MBMC)

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1A:
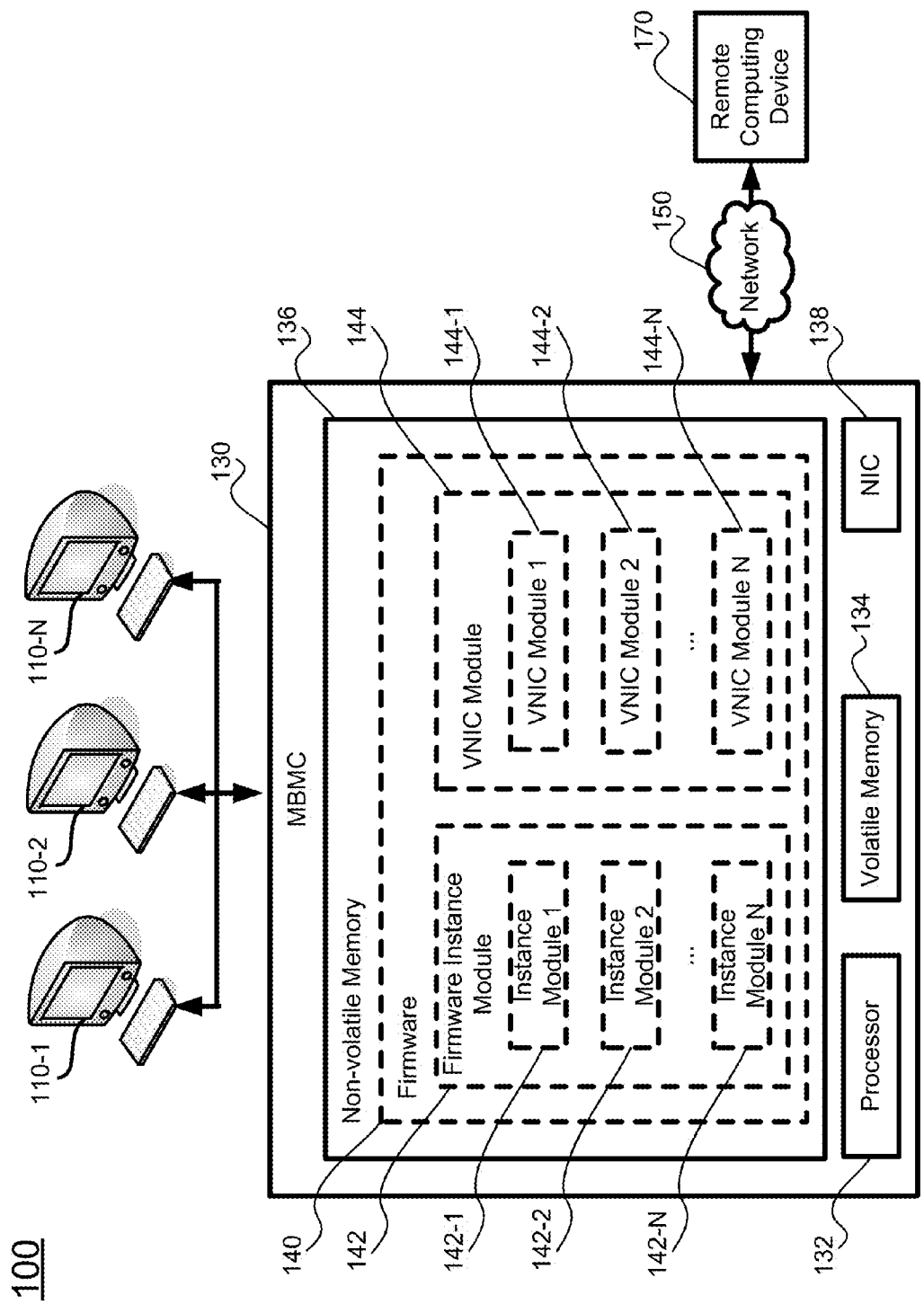
FIG. 1A schematically depicts a system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, a BMC has a flash memory or other types of non-volatile memory to store its firmware and other necessary configuration data. When multiple IPMI instances are running on the single BMC hardware chip (referred as a multiple BMC or MBMC), separate physical network interface may be used for each BMC instance to support LAN interface for that instance. As discussed above, since the number of the physical network interfaces is limited on the BMC systems on chip (SoC), the number of instances that could be supported on a MBMC system is thus limited. This results into a limit on the number of managed systems by a MBMC. Alternatively, if there is a need to increase the number of managed systems by a MBMC, the need results into an increase in the hardware cost and space of the MBMC.

In one aspect, the present disclosure relates to a BMC that supports multiple IPMI instances, without the need of having the same number of physical network interfaces on BMC SoC. In another aspect, the disclosure relates to a method of managing multiple computer platforms using a BMC hat supports multiple IPMI instances, without the need of having the same number of physical network interfaces on BMC SoC. In certain embodiments, the system and method may be applied to support dedicated LAN interface for each IPMI instance on a MBMC system to manage multiple systems. This does not limit the number of systems a single BMC can manage. Accordingly, the number of physical network ports may be reduced to one port. This is achieved by implementing virtual network ports for each instance of the BMC.

In certain embodiments, to achieve the purpose of managing multiple IPMI instances with limited or only one physical NIC, the following three requirements need to be met.

1. The operating system should treat the virtual interfaces as physical interfaces, such that all existing network tools may work seamlessly.
2. The virtual instances of the network ports should expose entire characteristics and functionalities of the underlying single physical port.
3. Implementing this method should not affect or require modifications of the existing BMC stack.

In certain embodiments, the virtual interfaces may be implemented as a network driver, which fits into the existing operating system architecture. Each virtual interface may be assigned a unique name, so the network tools can work with them. Thus, the above described requirement 1 may be satisfied.

Further, since the virtual interface does not have any real physical device associated, all communications from/to the operating system/applications will be redirected to the available single physical port of the BMC, which communicates to the external network. In the Ethernet communication, each network device should have a unique MAC address. The physical port of the BMC has a MAC address assigned by the vendor. Thus, for the virtual interfaces, a unique MAC address has to be assigned by the BMC vendor or it can dynamically generate a MAC address. With a proper MAC address for each of the virtual interfaces, the outgoing and incoming packets may be properly diverted to the respective virtual network driver. The virtual network driver maintains the counters/errors for the data traffic passed through it, which may be used by many network diagnostic tools. In certain embodiments, these network diagnostic tools may require the network driver to provide the information of the network port, such as speed, link status and other information. Since the virtual network port does not have these information, its virtual network driver get these information from the underlying single physical port. By providing all the information, the virtual network driver satisfies the above described requirement 2.

Moreover, the BMC uses standard network calls provided by the operating system to get information and communication, which are confirmed by the first two requirements. Thus, no changes to the BMC stack is required, which satisfies the above described requirement 3.

FIG. 1A schematically depicts a system according to certain embodiments of the present disclosure. As shown in FIG. 1A, the system 100 includes multiple computing platforms 110 and a BMC 130. The BMC 130 may be connected to the computing platforms 110 via a system interface, via one or more interfaces replacing or in addition to the system interface, such as a universal serial bus (USB) interface, or via the physical NIC 138. The system 100 may be a system that incorporates more than one interconnected system, such as a client-server network. Further, the BMC 130 may be connected to a network 150. The network 150 may be a wired or wireless network, and may be of various forms such as a local area network (LAN) or wide area network (WAN)

including the Internet. In certain embodiments, the system 100 may include other physical or virtual components not shown in FIG. 1A.

In certain embodiments, the system 100 may further include a remote computing device 170. The remote computing device 170 may be a remote server communicating with the instances provided by the BMC 130.

In certain embodiments, the system 100 may further include a computing device (not shown) functioning as a host computer of the BMC 130. In certain embodiments, the computing device may be a general purpose computer or a headless computer. Generally, the computing device includes a baseboard or the "motherboard." The baseboard is a printed circuit board to which a multitude of components or devices may be connected by way of a system bus or other electrical communication paths. Although not explicitly shown in FIG. 1A, the components on the baseboard are interconnected, and the layout of the components on the baseboard and the manner of the interconnection between the components on the baseboard is herein referred to as the configuration of the baseboard. One of ordinary skill in the art would appreciate that the configuration of the baseboard may be adjusted or changed according to the necessary design or manufacturing requirements. In certain embodiments, one of the computing platforms 110 may be the host computer for the BMC 130. In certain embodiments, the computing device may be an additional computer device independent from the computing platforms 110.

The components on the baseboard of the computing device may include, but not limited to, a processor, a memory, and other required memory and Input/Output (I/O) modules (not shown). In certain embodiments, the BMC 130 may also be a component on the baseboard of the computing device. In certain embodiments, the processor and the memory may be embedded on the baseboard, or may be connected to the baseboard through at least one interface. In certain embodiments, the interface may be physical hardware interface such as electrical connectors, buses, ports, cables, terminals, or other I/O devices.

The computing device may further include a storage device, which stores multiple software applications, including an operating system (OS). In certain embodiments, the storage device may be connected to the baseboard of the computing device. In certain embodiments, the computing device may include at least one I/O device (not shown) for generating and controlling input and output signals of the computing device. Examples of the I/O device include keyboards, touch pads, mouse, microphones, display screens, touch screens, or other I/O devices applicable for the computing device. Some I/O devices, such as touch screens, are provided for the dual input/output purposes.

The BMC 130 is a specialized microcontroller that manages the interface between system management software and platform hardware. In certain embodiments, the BMC 130 may be a service processor (SP). Different types of sensors can be built into the computing device, and the BMC 130 reads these sensors to obtain parameters such as temperature, cooling fan speeds, power status, OS status, etc.

The BMC 130 monitors the sensors and can send out-of-band (OOB) alerts to a system administrator of the computing device if any of the parameters do not stay within preset limits, indicating a potential failure of the computing device. In certain embodiments, the administrator can also remotely communicate with the BMC 130 from a remote management computer via a network to take remote action to the computing device. For example, the administrator may reset the computing device from the remote management computer through the BMC 130, and may obtain system information of the computing device OOB without interrupting the operation of the computing device.

In certain embodiments, the BMC 130 is a multiple BMC (MBMC) that provides multiple instances 143 corresponding to multiple computing platforms 110.

As shown in FIG. 1A, the BMC 130 includes a processor 132, a volatile memory 134, a non-volatile memory 136 and a NIC 138. In certain embodiments, one or more remote computing devices 170 may be connected to the BMC 130 via a network 150. In certain embodiments, the BMC 130 may include other components, such as at least one I/O device (not shown).

The processor 132 controls operation of the BMC 130. The processor 132 may execute the firmware 140 or other codes stored in the BMC 130. In certain embodiments, the BMC 130 may run on or more than one processor.

The volatile memory 134 may be the RAM, which is configured to store the data and information during the operation of the BMC 130. When the BMC 130 restarts, the contents stored in the volatile memory 134 will be lost.

The NIC 138 is a physical network hardware device which provides network connection functionalities to the BMC 130. For example, the NIC 138 enables the BMC 130 to be in a network communication with the remote computing device 170 through the network 150.

The non-volatile memory 136 is a non-volatile data storage media for storing computer executable code and data required for the operation of the BMC 130, such as a firmware 140 and any other necessary software or firmware components of the BMC 130. Examples of the non-volatile memory 136 may include flash memory, memory cards, USB drives, hard drives, floppy disks, optical drives, or any other types of data storage devices. In certain embodiments, the firmware 140 includes, among other things, multiple firmware instance modules 142 and multiple VNIC modules 144.

Figure 1B:
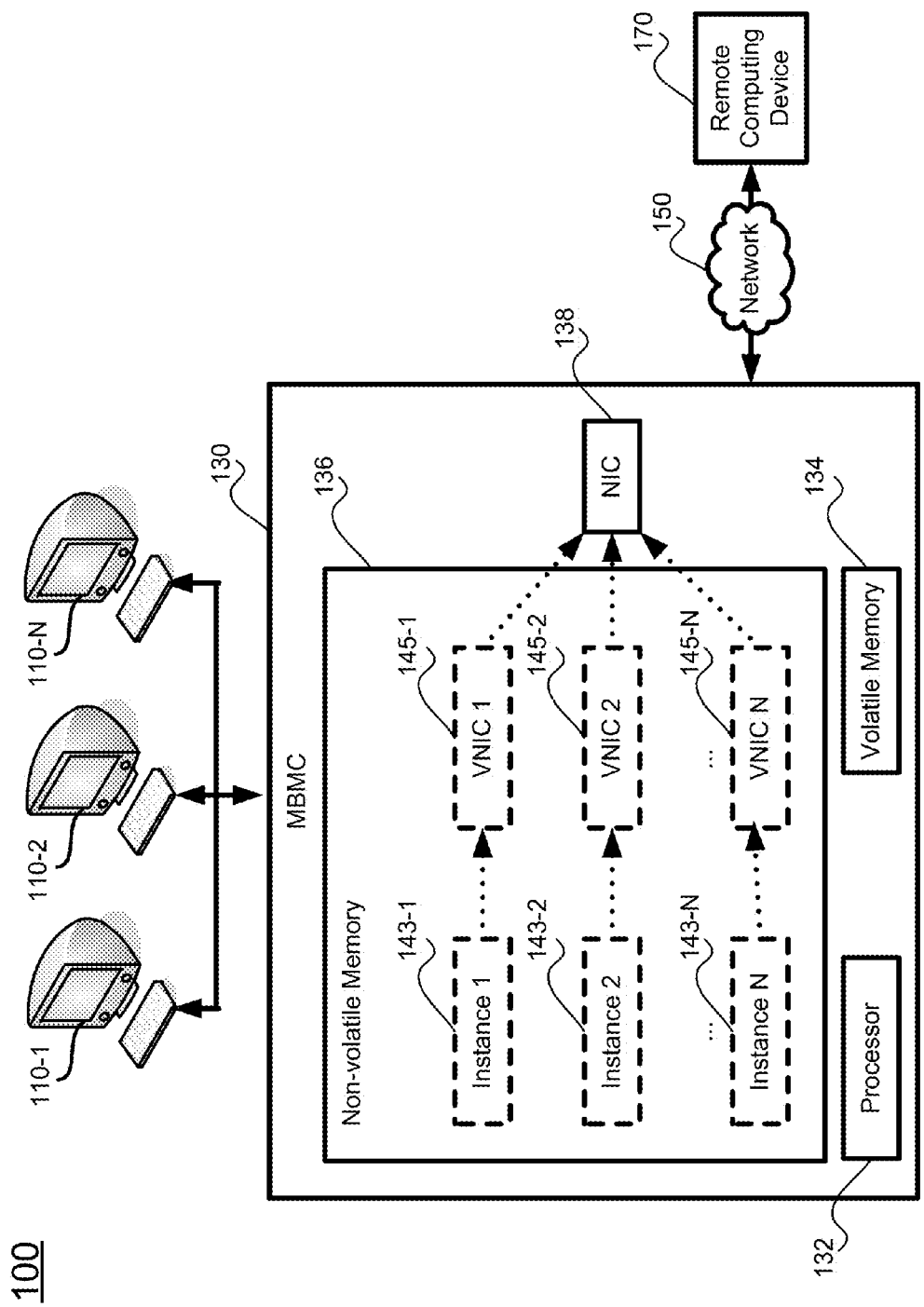
FIG. 1B schematically depicts a system according to certain embodiments of the present disclosure, where multiple instances are running.

The multiple firmware instance modules 142 includes instance module 1, instance module 2, instance module 3, . . . , instance module N as shown in FIG. 1A, which are labeled as 142-1, 142, -2, . . . , 142-N, respectively. The firmware instance module 142 is configured to provide multiple instances, such as instance 1, instance 2, . . . , instance N, as shown in FIG. 1B, which are labeled as 143-1, 143-2, . . . , 143-N. Each instance 143 may correspond to a specific one of the computing platforms 110. The instances 143-1, 143-2, . . . , 143-N may communicate with the computing platforms 110-1, 110-2, . . . , 110-N respectively through system interface or through the NIC 138.

The VNIC module 144 includes VNIC 1, VNIC 2, . . . , VNIC N, as shown in FIG. 1B, which are labeled as 145-1, 145-2, . . . , 145N, respectively. The VNIC module 144 is configured to provide VNIC 145-1, 145-2, . . . , 145-N as shown in FIG. 1B. Each VNIC 145 corresponds to a specific one of the instances 143 and a specific one of the computing platforms 110. In certain embodiments, each of the computing platforms 110 communicates with a corresponding remote computing device 170 through a respective instance, a respective VNIC, and the NIC via the network 150. The VNICs 145 share network resource provided by the physical NIC 138.

Each of the VNIC 145 may be assigned with or dynamically generated a media access control (MAC) address. The MAC address of each of the VNICs 145 is different from the MAC address of the NIC 138. The MAC addresses provides internet protocol (IP) information available for the VNICs 145 or the NIC 138, which allows network connectivity and network support of the BMC 130 to perform remote management.

In certain embodiments, each of the VNICs 145 corresponds to one of the instances 143, and the instance 143 corresponds to one of the computing platform 110. Since the VNIC 145 is not a physical device, when the computing platform 110 or the instance 143 communicates to the external network 150, the corresponding VNIC 145 would divert or redirect the incoming/outgoing message via the physical NIC 138. In other words, for each of the firmware instances 143, in response to a communication command to transmit data through the corresponding VNIC 145, the data are transmitted through the NIC 138.

In certain embodiments, each of the firmware instances 143 is communicatively connected to the corresponding one of the computing platforms 110 through the VNICs 145.

In certain embodiments, the firmware 140, when executed at the processor 132 of the BMC 130, is further configured to provide a plurality of communication interfaces. Each of the communication interfaces is configured to communicatively connect the firmware instances 143 to the corresponding one of the computing platforms 110. In certain embodiments, the communication interfaces include a system interface. Examples of the system interface may include an intelligent platform management bus (IPMB) interface, a keyboard controller style (KCS) interface, a server management interface chip (SMIC) interface, a block transfer (BT) interface, and a SMBus system interface (SSIF).

In certain embodiments, the firmware 140 may include a monitoring module (not shown) for monitoring status of the computing device of the BMC 130 or the computing platforms 110.

In certain embodiments as shown in FIGS. 1A and 1B, the dedicated NIC 138 is connected to the network 150 directly.

Figure 1C:
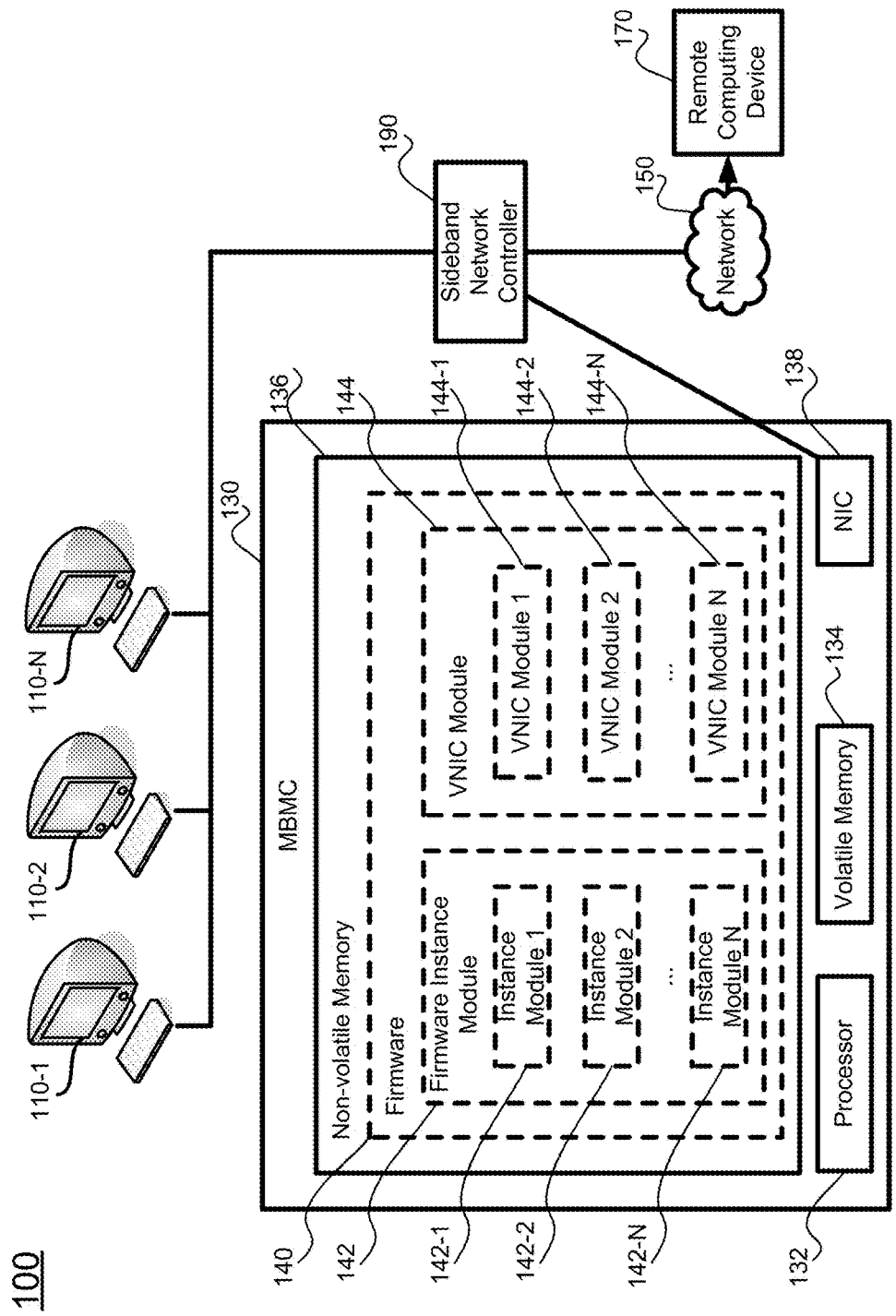
FIG. 1C schematically depicts a system according to certain embodiments of the present disclosure.
Figure 1D:
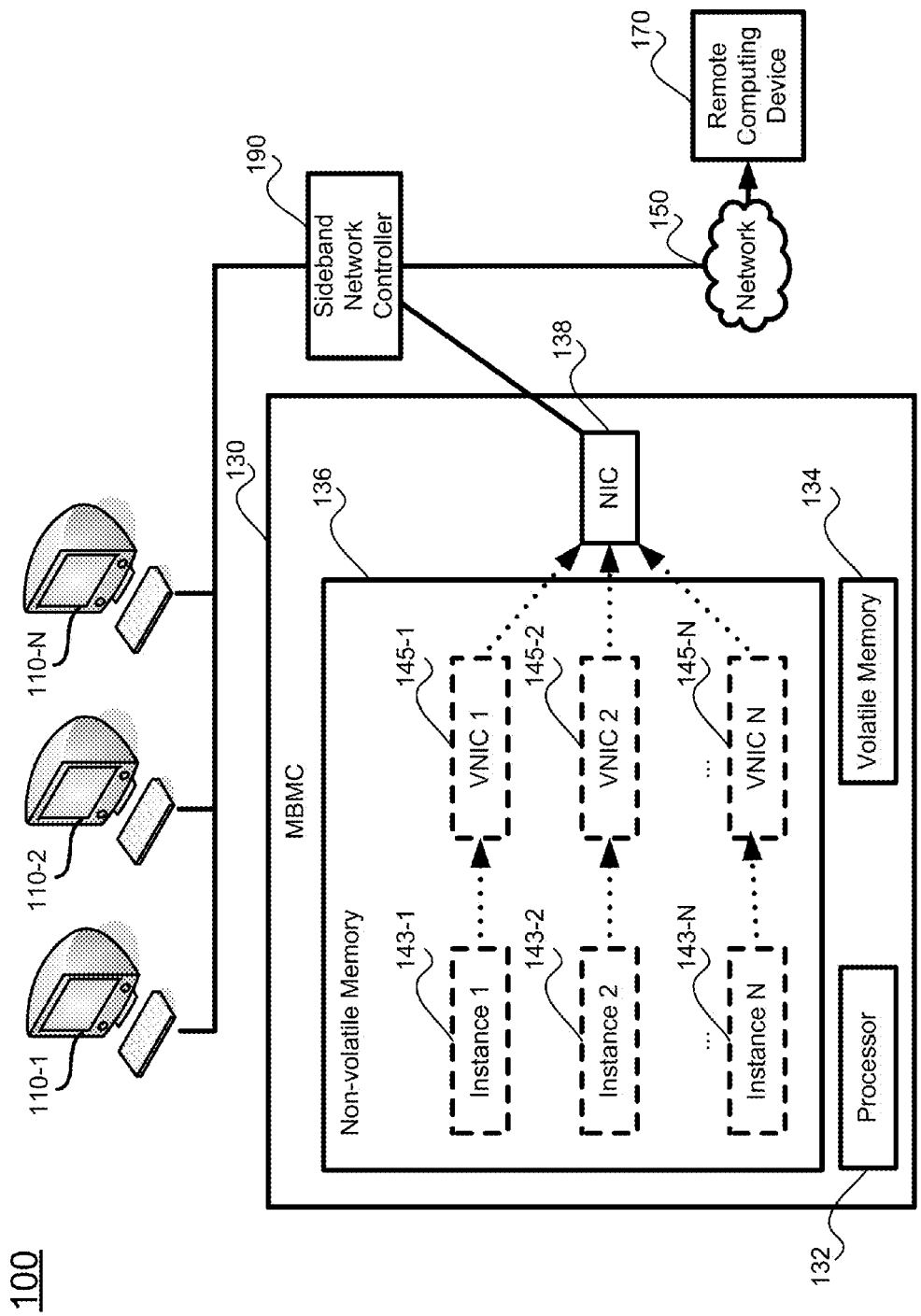
FIG. 1D schematically depicts a system according to certain embodiments of the present disclosure, where multiple instances are running.

In other embodiments, as shown in FIGS. 1C and 1D, the system 100 may further include a sideband network controller 190 that is connected to the network 150. The multiple computing platforms 110 and the NIC 138 are connected to the sideband network controller 190, and thus are in communication with the network 150 through the sideband network controller 190.

FIG. 1C schematically depicts a system according to certain embodiments of the present disclosure. The system shown in FIG. 1C is similar to the system shown in FIG. 1A, wherein the system 100 includes multiple computing platforms 110, a BMC 130, a network 150 and a remote computing device 170. Further, as shown in FIG. 1C, the system 100 includes a sideband network controller 190 that provides shared network connectivity to the management controller 130 as well as the managed platforms 110. The multiple platforms 110 are connected to the sideband network controller 190, the NIC 138 is connected to the sideband network controller 190, and the sideband network controller 190 is connected to the network 150, such that the multiple platforms 110 and the NIC 138 communicate with the remote computing device sequentially via the sideband network controller 190 and the network 150. The multiple platforms 110 and the NIC 138 are also in communication with each other through the sideband network controller 190.

FIG. 1D schematically depicts a system according to certain embodiments of the present disclosure, where multiple instances are running. The status of the system shown in FIG. 1D is similar to the status of the system shown in FIG. 1B. Each instance 143 may correspond to a specific one of the computing platforms 110. The instances 143-1, 143-2, ..., 143-N may communicate with the computing platforms 110-1, 110-2, ..., 110-N respectively through the NIC 138 via the sideband network controller 190. In certain embodiments, each of the computing platforms 110 communicates with a corresponding remote computing device 170 through the sideband network controller 190 and via the network 150. The sideband network controller 190 provides shared network connectivity to the management controller 130 and the managed computing platforms 110, for communicating the management controller 130 with the managed computing platforms 110, and for communicating the management controller 130 and the managed computing platforms 110 with the remote computing device 170 via the network 150.

Figure 2:
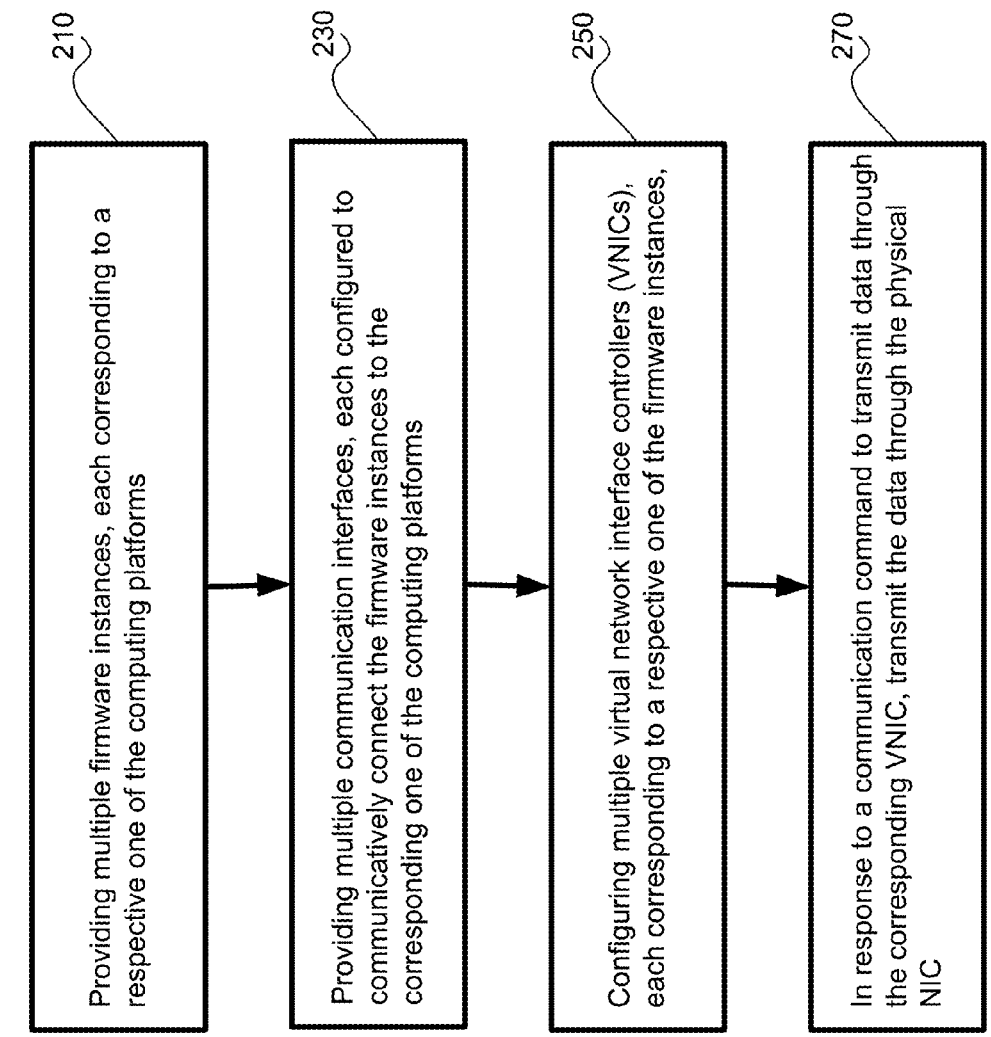
FIG. 2 depicts a flowchart of a method for managing multiple computing platforms according to certain embodiments of the present disclosure.

FIG. 2 depicts a flowchart of a method for managing multiple computing platforms of a system. In certain embodiments, the system implementing the method may be a system having the same structure as described above and shown in FIGS. 1A and 1B. In certain embodiments, although FIG. 2 lists the procedures in a particular sequential order, the procedures may be performed in a different order based on system requirements.

In certain embodiments, when the firmware 140 is executed at the processor 132, at procedure 210 as shown in FIG. 2, the executed firmware 140 provides multiple firmware instances 143. Each of the firmware instances 143 corresponds to one of the computing platforms 110. In certain embodiments, the BMC 130 is a multiple BMC (MBMC).

At procedure 250, the executed firmware 140 configures multiple VNICs 144. Each of the VNICs 144 corresponds to a respective one of the firmware instances 143. The VNICs 1444 are configured to share network resource provided by the physical NIC 138, and the VNICs are respectively operatively in communication with the physical NIC 138.

It should be particularly noted that the procedures 210 and 250, although listed in sequence as shown in FIG. 2, may be performed in a different order. In certain embodiments, the procedures 210 and 250 may be performed at the same time. In certain embodiments, the procedure 210 may be performed before or after the procedure 250.

In certain embodiments, when the firmware 140 is executed at the processor 132, at procedure 230 as shown in FIG. 2, the executed firmware 140 may further provide multiple communication interfaces. Each of the communication interfaces is configured to communicatively connect the firmware instance 143 to the corresponding one of the computing platforms 110. In certain embodiments, the communication interfaces includes a system interface. The system interface may include an IPMB interface, a KCS interface, a SMIC interface, a BT interface, and a SSIF.

In certain embodiments, each of the firmware instances 143 is communicatively connected to the corresponding one of the computing platforms 110 through the VNICs 145.

In certain embodiments, the physical NIC is assigned with a MAC address, and each of the VNICs is assigned with or dynamically generated a specific MAC address different from the MAC address of the physical NIC, such that outgoing and incoming information through the physical NIC are diverted to the respective VNICs based on the specific MAC addresses of the VNICs.

After providing the firmware instances at operation 210 and configuration of the VNICs at procedure 250, the BMC 130 is capable of perform procedure 270. At procedure 270, the BMC 130, in response to a communication command to transmit data through the corresponding VNIC 145, transmits the data through the physical NIC 138.

In a further aspect, the present disclosure is related to a non-transitory computer readable medium storing computer executable code. The code, when executed at one or more processer of a BMC 130, may perform the method as described above. In certain embodiments, the non-transitory computer readable medium may include, but not limited to, any physical or virtual storage media. In certain embodiments, the non-transitory computer readable medium may be implemented as the non-volatile memory 136 of the BMC 130 as shown in FIG. 1A or 1B.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system comprising:
a management controller for managing a plurality of computing platforms, wherein the management controller comprises:
a processor;
a physical network interface controller (NIC);
a volatile memory; and
a non-volatile memory storing computer executable code,
wherein the computer executable code, when executed at the processor, is configured to:
provide a plurality of firmware instances, each corresponding to a respective one of the computing platforms;
configure a plurality of virtual NICs (VNICs), wherein each of the VNICs corresponds to a respective one of the firmware instances, and the VNICs share network resource provided by the physical NIC; and
for each of the firmware instances, in response to a communication command to transmit data through the corresponding VNIC, transmit the data through the physical NIC, wherein the number of the plurality of computing platforms, the number of the plurality of firmware instances and the number of plurality of virtual NICs are the same or substantially the same; and
a sideband network controller,
wherein the sideband network controller is directly connected to a network, the plurality of computing platforms and the physical NIC, respectively, so that the plurality of computing platforms and the physical NIC are in communication with the network through the sideband network controller;
wherein the sideband network controller provides shared network connectivity to the management controller and the plurality of computing platforms such that the plurality of computing platforms and the physical NIC communicate with the remote computing device sequentially via the sideband network controller and the network; and
wherein the plurality of computing platforms and the physical NIC are also in communication with each other through the sideband network controller.

2. The system of claim 1, wherein each of the firmware instances is communicatively connected to the corresponding one of the computing platforms through the VNICs.

3. The system of claim 1, wherein the computer executable code, when executed at the processor, is further configured to:
provide a plurality of communication interfaces, each configured to communicatively connect the firmware instances to the corresponding one of the computing platforms.

4. The system of claim 3, wherein the communication interfaces comprises a system interface, and the system interface comprises an intelligent platform management bus (IPMB) interface, a keyboard controller style (KCS) interface, a server management interface chip (SMIC) interface, a block transfer (BT) interface, and a SMBus system interface (SSIF).

5. The system of claim 1, wherein the physical NIC is assigned with a media access control (MAC) address, and each of the VNICs is assigned with a specific MAC address different from the MAC address of the physical NIC, such that outgoing and incoming information through the physical NIC are diverted to the respective VNICs based on the specific MAC addresses of the VNICs.

6. The system of claim 1, wherein the computer executable code comprises:
a firmware instance module, configured to provide the firmware instances; and
a VNIC module, for configuring the VNICs.

7. The system of claim 1, wherein the management controller is a multiple baseboard management controller (MBMC).

8. The system of claim 1, further comprising at least one remote computing device in communication with at least one of the firmware instances through the physical NIC and the VNIC corresponding to the at least one of the firmware instances.

9. A method for managing a plurality of computing platforms, comprising:
providing, by a management controller, a plurality of firmware instances, wherein each of the firmware instances corresponds to a respective one of the computing platforms;
configuring, by the management controller, a plurality of virtual network interface controllers (VNICs), wherein each of the VNICs corresponds to a respective one of the firmware instances, and the VNICs share network resource provided by a physical network interface controller (NIC) of the management controller; and
for each of the firmware instances, in response to a communication command to transmit data through the corresponding VNIC, transmitting the data through the physical NIC, wherein the number of the plurality of computing platforms, the number of the plurality of firmware instances and the number of plurality of virtual NICs are the same or substantially the same;
wherein a sideband network controller is directly connected to a network, the plurality of computing platforms and the physical NIC, respectively, so that the plurality of computing platforms and the physical NIC are in communication with the network through the sideband network controller;

wherein the sideband network controller provides shared network connectivity to the management controller and the plurality of computing platforms such that the plurality of computing platforms and the physical NIC communicate with the remote computing device sequentially via the sideband network controller and the network; and wherein the plurality of computing platforms and the physical NIC are also in communication with each other through the sideband network controller.

10. The method of claim 9, wherein each of the firmware instances is communicatively connected to the corresponding one of the computing platforms through the VNICs.

11. The method of claim 9, further comprising:
providing a plurality of communication interfaces, each configured to communicatively connect the firmware instances to the corresponding one of the computing platforms.

12. The method of claim 11, wherein the communication interfaces comprises a system interface, and the system interface comprises an intelligent platform management bus (IPMB) interface, a keyboard controller style (KCS) interface, a server management interface chip (SMIC) interface, a block transfer (BT) interface, and a SMBus system interface (SSIF).

13. The method of claim 9, wherein the physical NIC is assigned with a media access control (MAC) address, and each of the VNICs is assigned with a specific MAC address different from the MAC address of the physical NIC, such that outgoing and incoming information through the physical NIC are diverted to the respective VNICs based on the specific MAC addresses of the VNICs.

14. The method of claim 9, wherein the management controller is a multiple baseboard management controller (MBMC).

15. A non-transitory computer readable medium storing computer executable code executable at a processor of a management controller, wherein the computer executable code, when executed at the processor of the management controller, is configured to:
provide a plurality of firmware instances, each corresponding to a respective one of the computing platforms;
configure a plurality of virtual network interface controllers (VNICs), wherein each of the VNICs corresponds to a respective one of the firmware instances, and the VNICs share network resources provided by a physical network interface controller (NIC); and
for each of the firmware instances, in response to a communication command to transmit data through the corresponding VNIC, transmit the data through the physical NIC, wherein the number of the plurality of computing platforms, the number of the plurality of firmware instances and the number of plurality of virtual NICs are the same or substantially the same, wherein a sideband network controller is directly connected to a network, the plurality of computing platforms and the physical NIC, respectively, so that the plurality of computing platforms and the physical NIC are in communication with the network through the sideband network controller;

wherein the sideband network controller provides shared network connectivity to the management controller and the plurality of computing platforms such that the plurality of computing platforms and the physical NIC communicate with the remote computing device sequentially via the sideband network controller and the network; and wherein the plurality of computing platforms and the physical NIC are also in communication with each other through the sideband network controller.

16. The non-transitory computer readable medium of claim 15, wherein each of the firmware instances is communicatively connected to the corresponding one of the computing platforms through the VNICs.

17. The non-transitory computer readable medium of claim 15, wherein the computer executable code, when executed at the processor of the management controller, is further configured to:
provide a plurality of communication interfaces, each configured to communicatively connect the firmware instances to the corresponding one of the computing platforms.

18. The non-transitory computer readable medium of claim 17, wherein the communication interfaces comprises a system interface, and the system interface comprises an intelligent platform management bus (IPMB) interface, a keyboard controller style (KCS) interface, a server management interface chip (SMIC) interface, a block transfer (BT) interface, and a SMBus system interface (SSIF).

19. The non-transitory computer readable medium of claim 15, wherein the physical NIC is assigned with a media access control (MAC) address, and each of the VNICs is assigned with a specific MAC address different from the MAC address of the physical NIC, such that outgoing and incoming information through the physical NIC are diverted to the respective VNICs based on the specific MAC addresses of the VNICs.

20. The non-transitory computer readable medium of claim 15, wherein the management controller is a multiple baseboard management controller (MBMC).

* * * * *